W. H. BROWN.
TIRE CHAIN.
APPLICATION FILED NOV. 28, 1916.
1,233,971.
Patented July 17, 1917.
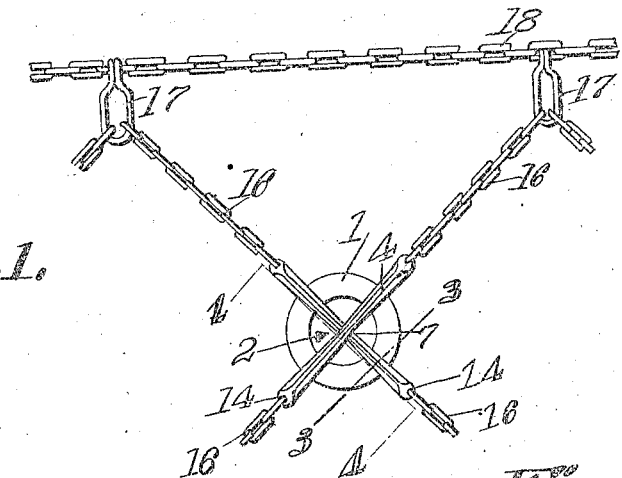
Fig.1.
Fig.2.
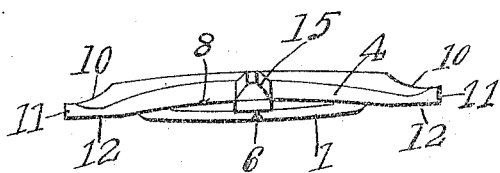
Fig.3.
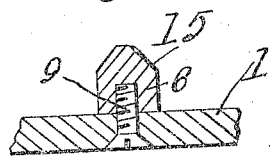
Fig.4.
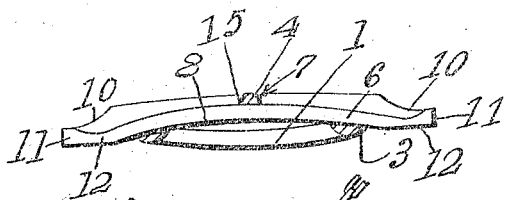
Fig.5.
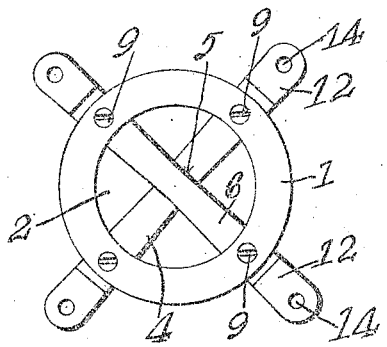
Fig.6.
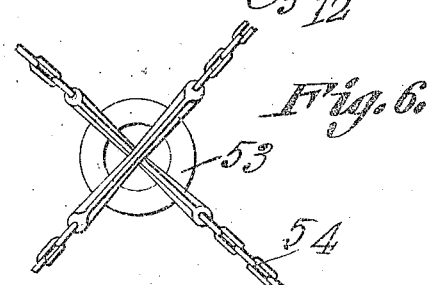
W. H. Brown
Inventor
Witnesses
by
Attorneys

UNITED STATES PATENT OFFICE.

WILLIAM H. BROWN, OF MARGARETVILLE, NEW YORK.

TIRE-CHAIN.

1,233,971.

Specification of Letters Patent. Patented July 17, 1917.

Application filed November 28, 1916. Serial No. 133,922.

*To all whom it may concern:*

Be it known that I, WILLIAM H. BROWN, a citizen of the United States, residing at Margaretville, in the county of Delaware and State of New York, have invented a new and useful Tire-Chain, of which the following is a specification.

The device forming the subject matter of this application is adapted to be applied to the tire of a vehicle wheel, for the purpose of preventing skidding, and to enable the tire to secure a firm hold on the ground.

The invention aims to improve the construction of traction member, and to provide a novel tire chain embodying the traction member above mentioned.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a portion of a tire chain embodying the present invention;

Fig. 2 is a side elevation of traction member;

Fig. 3 is a fragmental section on the line 3—3 of Fig. 1;

Fig. 4 is a section taken on the line 4—4 of Fig. 1;

Fig. 5 is a bottom plan of the traction member; and

Fig. 6 is a top plan showing a slightly modified application of the invention.

The traction member forming the subject matter of this application preferably but not necessarily is made of metal throughout. The traction member may be formed in one piece if desired, but in the present instance it is shown as comprising a relatively thin base or ring 1 having a central opening 2. Upon its under side, and upon its inner and outer edges, the ring 1 is beveled or rounded as shown at 3, so as to prevent the ring from cutting into the tire on which the ring rests.

Superposed on the ring 1 is a cross comprising rectangular interengaged bars, one of which is denoted by the numeral 4. The bar 4 has a notch 5 in its lower edge. The invention comprises a bar 6 having a notch 7 in its upper edge, the notches 7 and 5 in the respective bars being interengaged, so that the bars 4 and 6 preferably stand at right angles to each other, as shown clearly in Figs. 5 and 1. The under edges of the bars 6 and 4 are outwardly concaved as shown at 8, and against these outwardly concaved edges 8, the ring 1 abuts. The ring 1, if the device be fashioned in a plurality of parts, is attached to the bars 4 and 6 by securing elements 9 of any desired sort, as clearly shown in Figs. 5 and 3, the securing elements 9 passing upwardly or outwardly through the ring 1 and engaging the bars 4 and 6.

Adjacent their outer ends, the bars 4 and 6 are thinned as shown at 10 to form feet 11, the under surfaces of which are flat, as shown at 12. The feet 11 have openings 14. Because the ring 1 is received against the concaved lower edges 8 of the bars 4 and 6, the ring 1 does not tend to move laterally with respect to the bars 4 and 6, as would be the case if the lower edges of the bars were flat, and the strain on the securing elements 9 is decreased accordingly. The ring 1 projects below the lower faces 12 of the feet 11, and the greater part of the pressure is carried into the tire by way of the ring 1, the feet 11 being prevented from being pressed into the tire to an undesirable extent. The upper or outer edges of the bars 4 and 6 are bluntly sharpened, as shown at 15, to enhance their hold on the ground.

Flexible elements, preferably cross chains 16 are connected at their inner ends with the bars 4 and 6 by means of the openings 14, the outer ends of the cross chains 16 being united by suitable connectors 17 with side chains 18, one of which is shown in Fig. 1. The bars 4 and 6 and the cross chains 16 are disposed at an acute angle to the side chains 18.

In practical operation, the cross comprising the bars 6 and 4, combined with the ring 1, will give the structure an unusually secure hold on the ground, both for traction purposes and to prevent side skidding. Especially, if the ground is sufficiently soft, the rings 1 will take a secure hold upon the ground.

It will be understood that the openings 14 in the feet 11 may be of any desired size and shape, depending upon the nature of the cross chains 16.

It is not necessary that the device forming the subject matter of this application be embodied in a chain which extends entirely around the wheel, circumferentially. Thus, in Fig. 6, the numeral 53 denotes generally, a traction member of the kind hereinbefore described, the same carrying flexible elements 54 which may be connected with the felly or with the spokes of a wheel. This form of the invention is of peculiar utility in that it may be applied readily to a vehicle wheel which is stalled in the mud, it being difficult, under such circumstances, to jack up the car and apply to the entire circumference of the wheel, a chain of the type shown in Fig. 1.

Having thus described the invention, what is claimed is:—

1. In a device of the class described, a base; and a cross superposed on the base and secured thereto, the cross including rigid ends which project outwardly beyond the periphery of the base, the base projecting beyond the arms, in a direction at right angles to that in which the arms extend, whereby the base will prevent the rigid ends of the arms from cutting into a tire, under ground-pressure.

2. In a device of the class described, a traction member including a cross comprising intersecting arms, the central portions of the inner faces of the arms being concaved; and a base ring on which the cross is superposed, the ring being seated in the concaved portions of the arms, and being secured thereto.

In testimony that I claim the foregoing as my own, I have hereto affixed my signature in the presence of two witnesses.

WILLIAM H. BROWN.

Witnesses:
EDGAR A. MARKS,
S. A. DUGAN.